United States Patent [19]

Tanaka

[11] Patent Number: 4,483,414
[45] Date of Patent: Nov. 20, 1984

[54] SOUND DAMPENING DEVICE FOR TELEPHONES

[76] Inventor: John S. Tanaka, 1343 Shoreway Rd., Belmont, Calif. 94002

[21] Appl. No.: 508,069

[22] Filed: Jun. 24, 1983

[51] Int. Cl.³ .......................................... G10K 11/04
[52] U.S. Cl. ................... 181/242; 179/180; 179/187
[58] Field of Search ............ 179/180, 184, 185, 187, 179/188; 181/242, 270

[56] References Cited
U.S. PATENT DOCUMENTS 2,212,349  8/1940  Mayer ................................. 179/185
2,478,783  8/1949  Scher ................................. 179/180
2,697,141  12/1954  Smith ................................ 179/187
2,826,649  3/1958  Desbrow ............................ 179/187
2,851,544  9/1958  Wisdom ............................ 179/188
4,057,127  11/1977  Braden .............................. 181/242

Primary Examiner—Gene Z. Rubinson
Assistant Examiner—Danita R. Byrd
Attorney, Agent, or Firm—Thomas Schneck

[57]  ABSTRACT

A sound dampening device for telephones comprising a sleeve which fits over a telephone mouthpiece and contains a mat of spaced-apart thin rod-like members extending radially inward in a direction transverse to the voice sound waves.

7 Claims, 4 Drawing Figures

U.S. Patent  Nov. 20, 1984  4,483,414
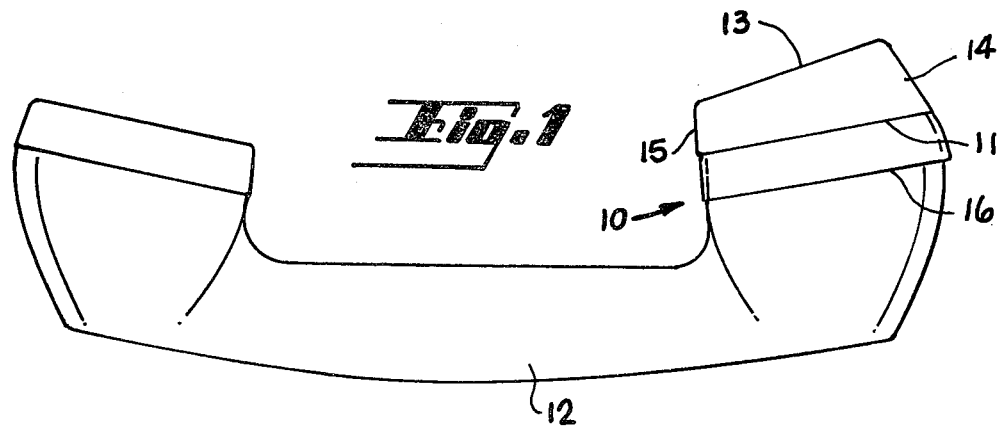
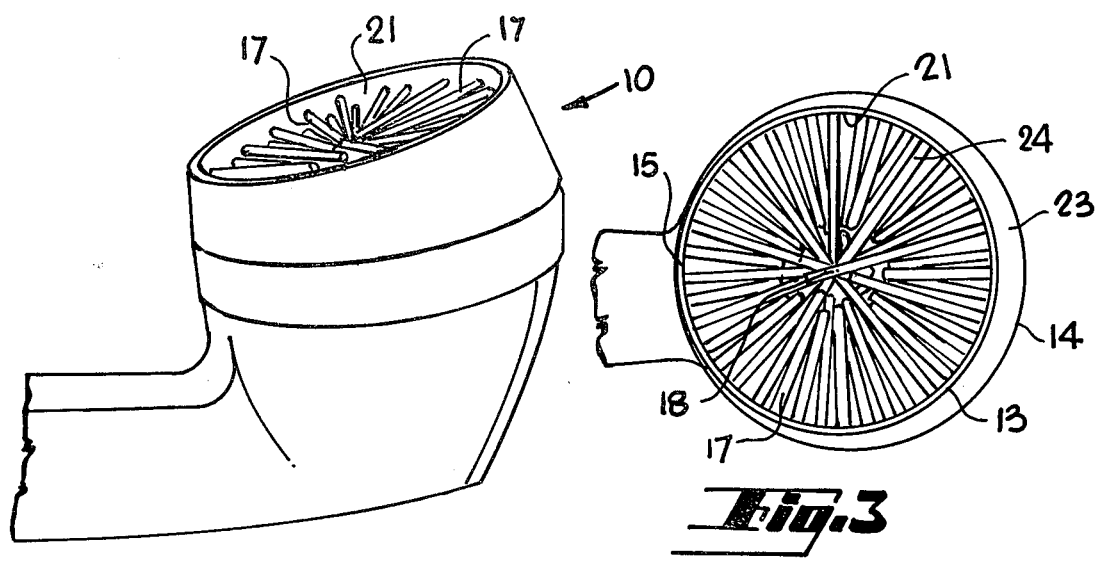
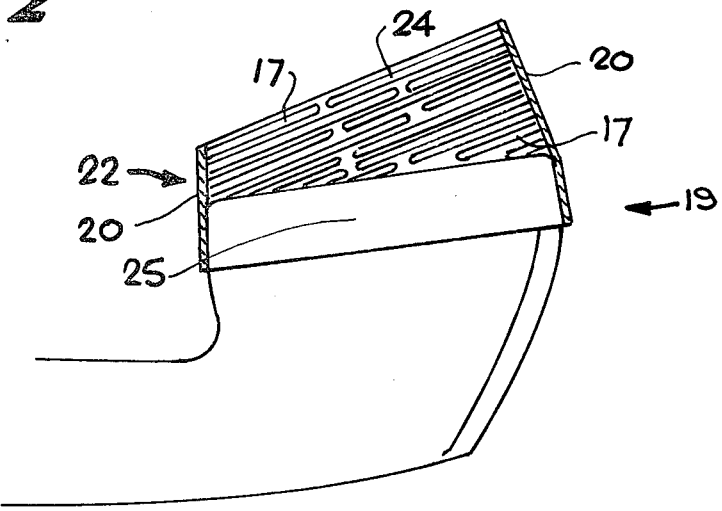

SOUND DAMPENING DEVICE FOR TELEPHONES

DESCRIPTION

1. Technical Field

The invention relates generally to sound attenuating devices for telephones or microphones and more particularly to a sound amplitude dampening device for a telephone mouthpiece.

2. Background Art

Various devices have been used in the past to suppress background noise pickup by a microphone or telephone.

In U.S. Pat. No. 2,826,649 a perforated sound screen over the mouthpiece has a rotatable shutter which opens or shuts apertures allowing sound passage or exclusion. In U.S. Pat. No. 2,851,544 a voice screen for a telephone mouthpiece has a compressible disc in a cover which may be seated against a compressible ring attached to a telephone mouthpiece for preventing sounds from entering the mouthpiece. In U.S. Pat. No. 4,057,124, a sound suppressor for preventing background noise interference in a microphone of a citizen's band radio comprises flat metallic foil and paper discs sandwiched between two sheets of metallic foil having centrally placed openings.

This prior art is concerned principally with eliminating background extraneous noise or blocking out the voice completely from the mouthpieces of the telephone or microphone. Frequently there is a need to modify the voice volume itself, not background noise, such as for loud voices without distorting or eliminating the voice sound. While telephones have some electronic automatic gain compensation, gain control is limited. Many voices are offensively loud, even beyond the ability of phone equipment compensation.

It is therefore the object of the invention to provide a sound amplitude attenuator or dampening device for the mouthpiece of a telephone that partially absorbs the sound wave energy generated by a voice thereby lowering the loudness level prior to entering the telephone mouthpiece.

It is another object of the invention to provide a sound amplitude dampening device that is easily fabricated out of durable materials and is not susceptible to damage.

DISCLOSURE OF INVENTION

The above objects have been met by a molded sleeve which fits over the telephone mouthpiece and is angled towards the speaker's mouth such that the sound waves impinge directly on multiple overlapping, centrally convergent, spaced apart rods extending radially from the internal side walls of the sleeve. A plurality of layers of such rods form a mat. Interstitial air passages between the rods allow passage of attenuated sound waves through the mat to the transmitter without changing the voice pitch or muffling the sound.

BRIEF DESCRIPTION OF DRAWINGS

FIG. 1 is a side view of the sound dampening sleeve of the present invention placed over the mouthpiece of a telephone handset.

FIG. 2 is a perspective of the sound dampening sleeve of FIG. 1 on a telephone mouthpiece.

FIG. 3 is a top view of the sound dampening sleeve of FIG. 1.

FIG. 4 is a sectional view of the sound dampening sleeve of FIG. 1.

BEST MODE FOR CARRYING OUT THE INVENTION

With reference to FIG. 1, the sound dampening sleeve 10 is shown in place over the mouthpiece 11 of a telephone handset 12. The upper face 13 of the sleeve is angled towards the speaker mouth by having the front wall 14 of greater width tapering down to a smaller width at the back wall 15. This tapering reduces the sound energy directed to a sound sensitive pick-up in a telephone or microphone. The cross-sectional area of the bottom opening 16 of the sleeve is of slightly larger size than that of a telephone mouthpiece allowing placement of the sleeve over the mouthpiece to form a firm frictional connection.

Radially inwardly extending thin rod-like members 17, in several layers, are shown in FIG. 2 attached to the inner peripheral wall region 21 of the sleeve. They are mutually spaced apart at the point of attachment to the inner wall by a dimension on the order of a few cross-sectional rod diameters or widths. They are placed, due to the angle of the upper face of the sleeve, so that voice sound waves impinge directly on the longitudinal length of rods, thus absorbing or reflecting part of the energy and lowering the loudness level or amplitude of impinging waves.

As shown in FIG. 3, the mat is denser at the center 18 due to the overlapping of the rod ends. Each rod may have a cross-sectional dimension in the range of one to four millimeters or so and a length of a few centimeters. Lengths are generally unequal, although this is not critical.

FIG. 4 shows a section of the sound dampening sleeve 10. An open annular recess 25 in the bottom section 19 of the sleeve fits snugly over the mouthpiece. Above this bottom open recess, rod-like members 17 are attached at spaced intervals along the inner circumference 21 and at intervals up and down the side walls 20 of a central chamber 22. The rod members extend radially inward from the side walls in layers forming an intermeshing mat. As shown in FIGS. 3 and 4, interstitial air pockets 24 between each layer of rod members and between each circumferentially placed rod allow passage of the amplitude diminished voice sound wave to the telephone transmitter in the mouthpiece without changing the frequency or pitch.

The sound dampening sleeve 10 may be molded out of rubber or rubber-like material. The rubber-like material may be a synthetic product with properties similar to that of rubber such as flexibility, toughness, resistance to wear and elasticity. This would include such synthetic rubbers as cis-polybutadiene and cis-polyisoprene. The material used must have sufficient strength so that the rods extend radially inward in an upright position to maintain the interstitial air passages. The rods may be flexible or rigid. The sleeve and rod members may be formed separately by suitable molds and then assembled. The rod members may also be formed as a flat sheet of upstanding rods in the correct spacing configuration which is then joined end to end so as to form the radially inwardly extending rod formation.

The preferred embodiment is shown to fit over the conventional telephone handset having an annular mouthpiece. However the sound dampening device of the invention may be shaped to fit other telephone mouthpiece designs such as designer phones or to fit microphones such as for walkie-talkie radios, wherein the recess containing the mat of sound wave energy absorbing rods is similarly placed in relation to the speaker's voice sound waves.

Due to the multiple thin rod members, the sound absorbing characteristics of the invention are not easily damaged. Removal or injury to one or more rod members does not significantly alter the capacity of the interlocking mat to absorb the sound wave energy. There is no requirement for machining of parts nor are close tolerances required for fit due to the flexible nature of the sleeve and rod members. Since the sleeve is made from rubber or plastic, it is easily sanitized between uses without damaging the various elements.

I claim:

1. A sound dampening device for a mouthpiece of a telephone comprising, a sleeve having a bottom recess of a size to adaptively fit over a mouthpiece, and having a central chamber containing several layers of thin, flexible, rod-like members extending radially inward from the recess side walls, one layer juxtaposed to another layer with members spaced apart so as to form an intermeshing mat having interstitial air passages whereby said thin, flexible members promote sound attenuation.

2. The apparatus of claim 1 wherein the rod-like members have a cross sectional dimension in the range of one to four millimeters.

3. The apparatus of claim 1 wherein the sleeve and rod-like members are molded from rubber or a rubber-like material.

4. The apparatus of claim 1 wherein the outside walls of said sleeve are tapered so as to decrease sound admittance compared to a mouthpiece to which the sound dampening device is connected.

5. A sound dampening device for a telephone mouthpiece comprising, a sleeve body having a lower recess of a size to adaptively fit over a telephone mouthpiece and having a central chamber containing thin, flexible, rod-like members, said members having one end attached to walls of the inner periphery of said central chamber and extending radially inward to the center axis of the chamber so as to form a layered mat, one layer juxtaposed to another layer with members separated by interstitial air passages, whereby said thin, flexible members promote sound attenuation.

6. The apparatus of claim 5 wherein the outside walls of said sleeve are tapered so as to decrease sound admittance compared to a mouthpiece to which the sound dampening device is connected.

7. The apparatus of claim 5 wherein the sleeve and rod-like members are molded from rubber or a rubber-like material.

* * * * *